Figure 4:
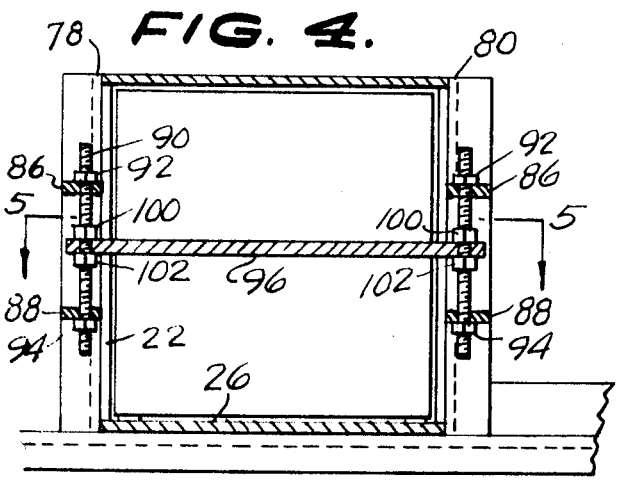

United States Patent [19]
Dingler

[11] 3,736,823
[45] June 5, 1973

[54] STORAGE BATTERY CASING SLICER
[76] Inventor: Henry Albert Dingler, P.O. Box 143, Cedartown, Ga. 30125
[22] Filed: May 14, 1971
[21] Appl. No.: 143,475

[52] U.S. Cl. .......................83/165, 83/431, 83/569, 83/700, 83/903, 83/925
[51] Int. Cl. ...........................B26d 1/02, B26d 7/26
[58] Field of Search.....................83/566, 569, 613, 83/431, 903, 914, 925, 104, 109, 696, 697, 700, 163, 165, 567, 568

[56] References Cited
UNITED STATES PATENTS

| | | | |
|---|---|---|---|
| 584,401 | 6/1897 | Raab | 83/569 X |
| 3,152,504 | 10/1964 | Brown | 83/925 R X |
| 863,840 | 8/1907 | Freese | 83/696 X |
| 3,051,030 | 8/1962 | Winkel | 83/903 X |
| 2,131,345 | 9/1938 | Dinzl | 83/569 X |
| 2,211,051 | 8/1940 | Bolling | 83/569 X |

Primary Examiner—Andrew R. Juhasz
Assistant Examiner—James F. Coan
Attorney—Berman, Davidson and Berman

[57] ABSTRACT

A storage battery casing slicer has a reciprocable ram movable on a table. A battery is placed on the table to be thrust forward by the ram. At least one fixed knife is placed transverse the path of the battery and shears away at least one (preferably the top) wall of the battery casing on forward movement of the plunger.

5 Claims, 8 Drawing Figures

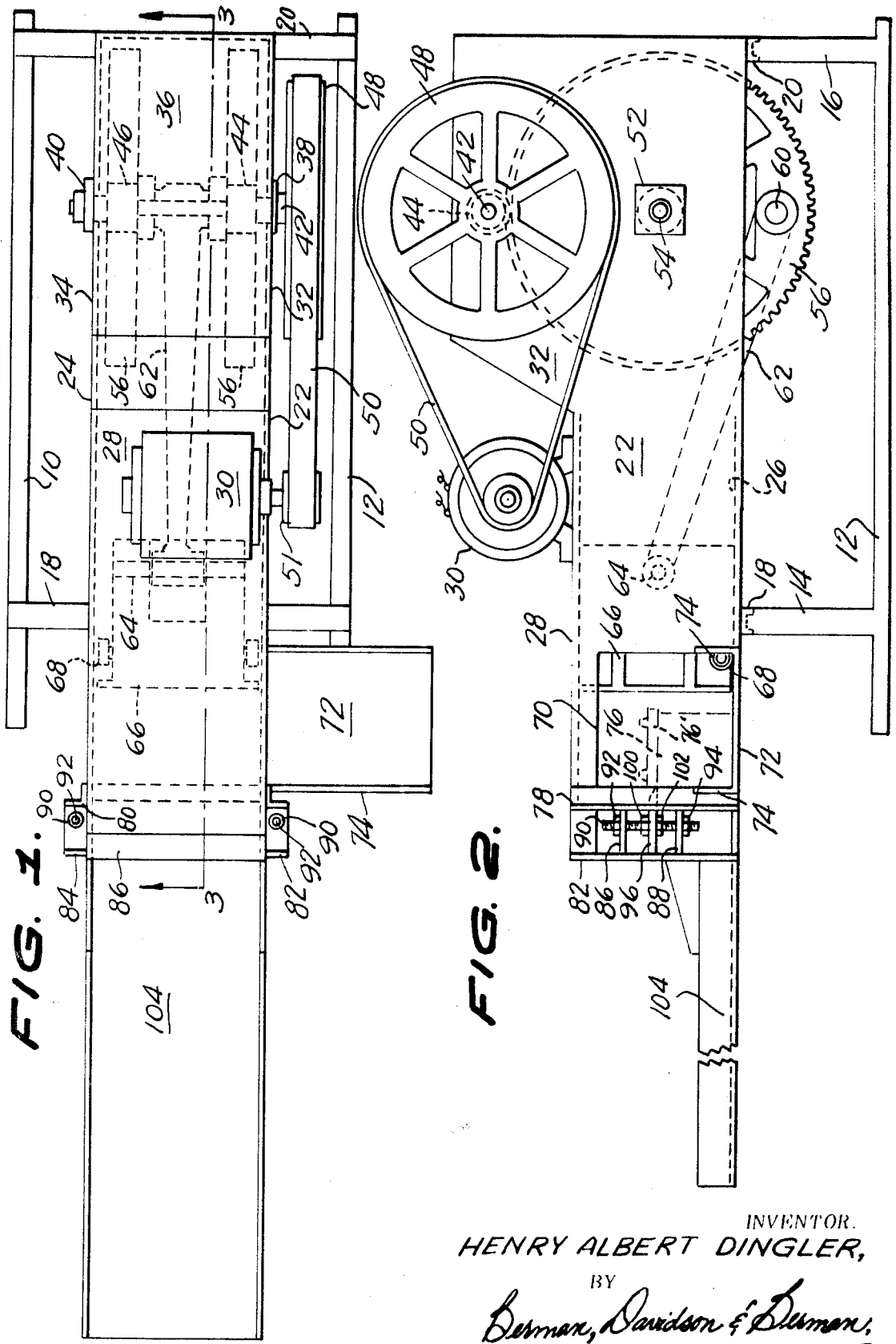

PATENTED JUN 5 1973

3,736,823

SHEET 2 OF 3

INVENTOR.
HENRY ALBERT DINGLER,
BY
Berman, Davidson & Berman,
ATTORNEYS.

INVENTOR.
HENRY ALBERT DINGLER,
BY
Berman, Davidson & Berman,
ATTORNEYS.

STORAGE BATTERY CASING SLICER

BACKGROUND OF THE INVENTION

All storage batteries "wear out" in the sense that they become unresponsive to charging efforts. This, however, is particularly true of automobile storage batteries which, because of the immense amperages drawn by cold weather starting of the engine and by the necessity of operating at temperature ranges between considerably below zero up to as much as 150° to 160°F. plus the fact that they are subjected to vibration and more or less "shock" loading over long periods of time, are particularly liable to deterioration. Because automobile storage batteries are at once more numerous and shorter lived than those for other purposes, the specification hereinafter will be directed to the handling of such batteries, though this is not to exclude possibility of treating storage batteries designed for other purposes.

Most of the weight of an automobile storage battery is attributable to its lead content, the lead being present either as metallic lead alloys, lead oxides, lead sulfates and other lead compounds.

Lead is not only the major component by weight of the battery but is the most expensive component. Moreover, the lead content of a worn-out battery is virtually the same as that of a new battery. Accordingly, worn-out storage batteries present an excellent opportunity for highly profitable reclamation.

SPECIFICATION

It is an object of this invention to provide a machine for slicing away the top and/or bottom panels of a worn-out battery casing.

It is a further object of this invention to provide a machine as aforesaid in which a worn-out battery has one wall pressed against a horizontal knife so that the battery moves against the knife, which severs the top and/or bottom of the casing of the battery.

It is a further object of this invention to provide a machine as aforesaid in which the horizontal knife (or knives) is vertically adjustable relative to the path taken by the battery so that the cutting action takes place in a plane vertically removed from the body of plates and/or separators.

It is a further object of this invention to provide a machine as aforesaid which, during the cutting operation, segregates the severed tops and/or bottoms so that these may be subjected to specialized reclamation procedures.

Figure 6:
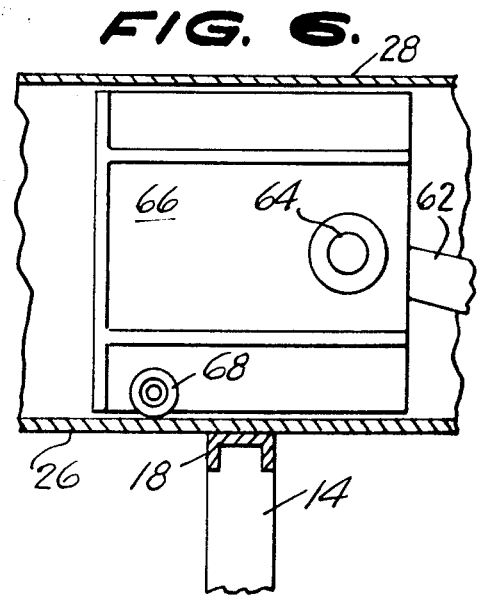
Figure 5:
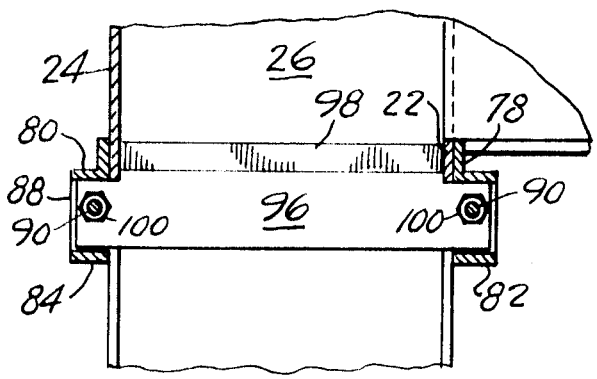
Figure 3:
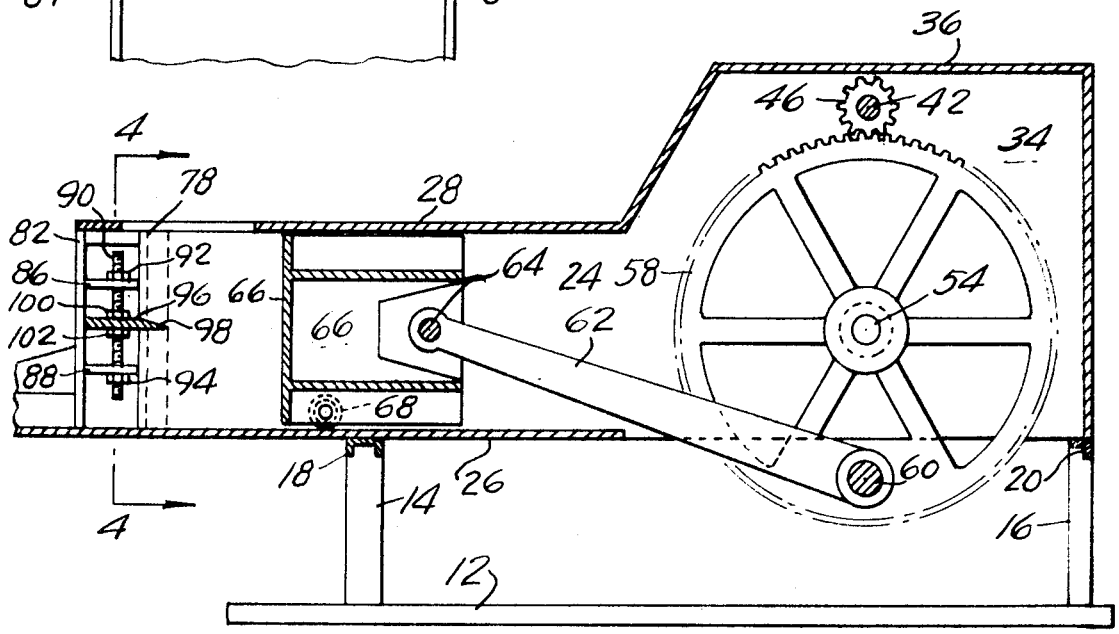
Figure 7:
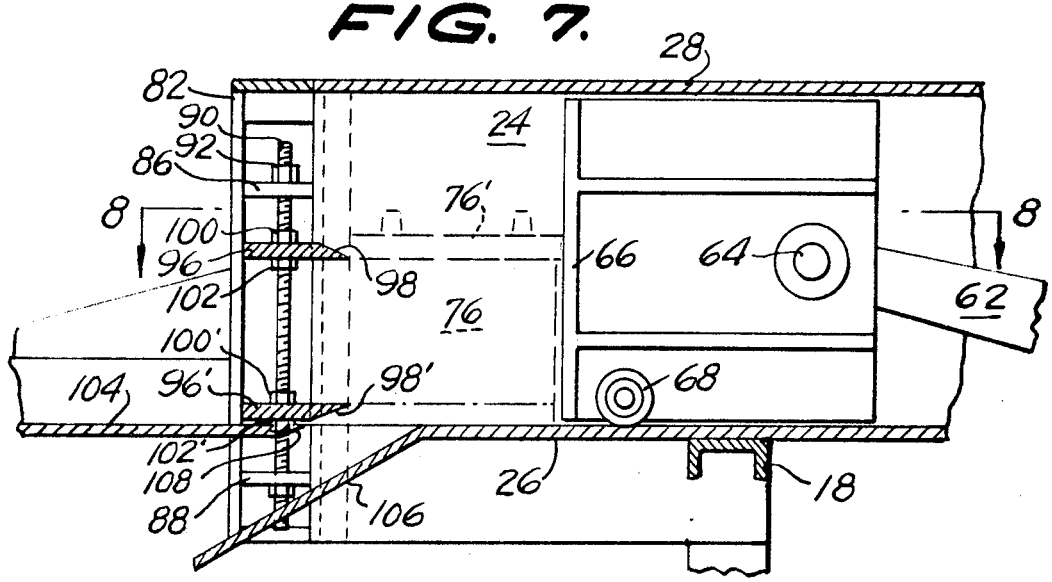
Figure 8:
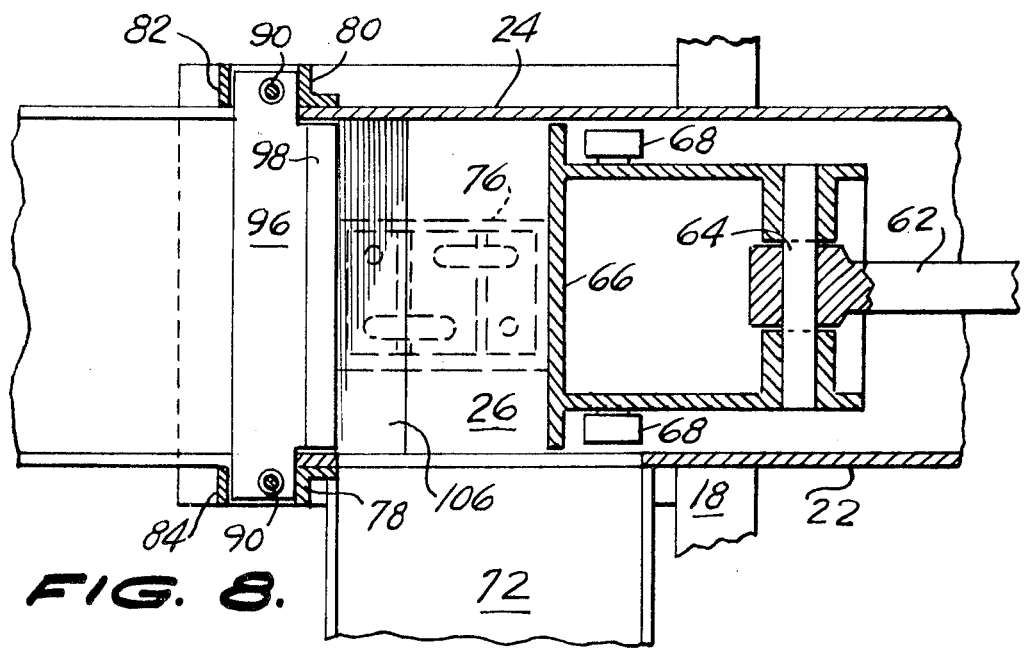

The above and other objects will be made clear from the following detailed description taken in connection with the annexed drawings, in which:

FIG. 1 is a top plan view of the machine as a whole;
FIG. 2 is a side elevation of the machine of FIG. 1;
FIG. 3 is a section on the line 3–3 of FIG. 1;
FIG. 4 is a section on the line 4—4 of FIG. 3;
FIG. 5 is a plan view partially in section taken on the line 5—5 of FIG. 4;
FIG. 6 is an elevation partly in section corresponding to the central part of FIG. 5 and illustrating certain constructional details in connection with the ram and its support,
FIG. 7 is a view generally similar to FIG. 4, but showing the use of two knives simultaneously to slice off both top and bottom of the battery; and FIG. 8 is a section on the line 8—8 of FIG. 7.

Referring now to FIGS. 1 and 2, the machine is supported by base plates 10 and 12 which are connected by forward risers 14 and rearward risers 16 to cross supporting beams 18 and 20. A pair of spaced vertical side plates 22 and 24 are welded to the cross beams 18 and 20 as is a horizontal bottom plate 26 which also connects the lower edges of the side plates 22 and 24. A top plate 28 connects the upper edges of the side plates 22 and 24 and on the top plate 28 is mounted a motor 30.

The side plates 22 and 24 have upstanding rearward portions 32 and 34 tied together by a supplementary top plate 36. A pair of bearings 38 and 40 are secured to the riser portions 32 and 34 and support shafts 42. Inside the risers 32 and 34 a pair of pinions 44 and 46 are secured to the shafts 42. A pulley 48 is secured to one of the shafts 42 outside riser 32 and is driven from the motor 30 by a belt 50 and pulley 51.

Bearings 52 are secured about midway the height of side plates 22 and 24 and in each of the bearings 52 is mounted a stub shaft 54. Secured to each of the shafts 54 is a large gear 56 meshing respectively with the pinions 44 and 46.

A crank pin 60 is supported by the two gears 56 extending between them and adjacent the rims thereof. A connecting rod 62 is rotatably mounted on the pin 60 and at its opposite end is oscillatably mounted on a wrist pin 64 which is secured in a ram 66 for reciprocating movement on the base plate 26.

A crank pin 60 is supported by the two gears 56 extending between them and adjacent the rims thereof. A connecting rod 62 is rotatably mounted on the pin 60 and at its opposite end is oscillatably mounted on a wrist pin 64 which is secured in a ram 66 for reciprocating movement on the base plate 26.

As best seen in FIGS. 2, 3 and 6, the ram 66 fits loosely between the top and bottom plates 26 and 28 and is supported at its lower face against the plate or table 26 by wheels 68 which are journaled on shafts mounted in the ram 66.

Forward of the rearmost position of the ram 66 the side plate 22 is cut away to expose the bottom plate 26 to form an opening 70. A channel has its bottom portion 72 welded to the bottom plate 26 and its side wall 74 welded to the adjacent portions of the side wall 22 to define a feed chute for supplying batteries 76, as shown in phantom outline in FIG. 2.

Extending vertically and secured respectively to the side walls 22 and 24 are a pair of angle irons 78 and 80, each having one leg welded to a side wall 22 or 24, with the opposite leg projecting outwardly from the wall to which the angle iron is secured. Forwardly of the angle irons 78 and 80 are a pair of straps 82 and 84 welded to the base plate 26 and projecting outwardly parallel to the projecting flanges of the angle irons 78 and 80. The straps 82 and 84 are respectively connected to the projecting flanges of angle irons 78 and 80 by cross members 86 and 88. Adjacent each end the cross members 86 and 88 have mutually registering perforations to receive threaded shafts 90. Nuts 92 are threaded on the upper ends of the shafts 90 and contact the upper side of the cross member 86 while nuts 94 are threaded on the lower end of the shafts 90 and contact the lower face of the cross member 88.

A slicer blade 96 extends across the entire width of the machine and has its ends slidably mounted on the shafts 90 and has a beveled edge 98 facing rearwardly toward the ram 66. The blade 96 is placed between upper nuts 100 and lower nuts 102 which are also threaded to the shafts 90. This arrangement permits the blade 96 to be firmly secured at any desired elevation above the base plate 24. In FIG. 2, the battery 76 is shown at rest on the base plate or table 26 with its cover 76' just above the edge of the blade 96. With the parts in this position, when the ram 66 advances leftward in FIG. 2, it thrusts the battery against the blade 96, severing the part 76' from the body of the battery 76, the battery itself being thrust onto a receiving chute 104. With the battery top are severed portions at least of the positive and negative plates as well as the connecting and binding posts so that the cover, as severed, represents considerable valuable reclaimable material.

As batteries are usually manufactured, the bottom has interior ribs below the positive and negative plates and between these ribs material sloughing off from the plates accumulates. Occasionally, therefore, it will be desirable to sever not only the top but the bottom of the battery. Since the sediment between the internal ribs of the battery bottom also represents reclaimable material, an arrangement for doing this is illustrated in FIGS. 7 and 8.

Most of the parts in FIGS. 7 and 8 are the same as and bear the same reference numerals as the parts illustrated in FIGS. 1—6. There has been added, however, as best seen in FIG. 7, a lower blade 96' having its ends slidable on the shafts 90 and secured in place by nuts 100' and 102'. The blade has a beveled edge 98' which, however, faces downwardly, that is, on the side opposite the bevel 98 of the blade 96.

The base plate 26 is slotted adjacent the lower blade 96' and a chute 106 slopes downwardly from the rear edge of the slot while the continuation 104 of the base plate or table 26 has its rear edge beveled at 108 to assist in guiding the severed lower panel of the storage battery into the chute 106.

By the same token, the bevel 98 tends to lift the severed upper panel 76' from the body of the battery 76 and permit the plate to lie freely on the battery after severance.

It will be realized that storage batteries regardless of voltage, size, make or model, all are quite rigid rectilinear bodies. The machine is made wide enough to accommodate the largest battery it is designed to accept and the slicing blade or blades are highly adjustable in the vertical so as to enter the battery at an optimum level for its particular purpose.

It is to be noted that all adjustments of the blade or blades lie laterally removed from the width of the table or base plate 26 and the adjustment is such as to permit accommodation very closely to the optimum requirements for severance at either top or bottom.

No doubt, variations in detail will occur to anyone skilled in the art who peruses this application. It is not intended, therefore, to limit the invention to the precise details disclosed herein.

What is claimed is:

1. A machine for slicing at least one selected wall from a rectangular storage battery, said machine comprising: a planar horizontal table providing sliding support for a storage battery to be sliced; a ram having a generally planar face at right angles to said table; at least one slicing knife mounted above and extending completely across and parallel to said table, the slicing edge of said knife facing said ram; means for adjusting the vertical height of said knife above said table with the ends of said knife being slidable on vertical, threaded shafts, said shafts being mounted, one on each side of said table, said knife being clamped at each end to one of said shafts by lock nuts threaded on said shafts and engaging opposite faces of said knife, and means for reciprocating said ram towards and from said knife.

2. The machine of claim 1, in which each of said threaded shafts is axially adjustable.

3. The machine of claim 1, including a second slicing knife similar to said first-named knife, located below said first-named knife, above said table and means for adjusting the vertical height of said second-named knife above said table.

4. The machine of claim 3, including, on each knife, a bevel from its slicing edge to the body of the knife, the bevel of the upper knife sloping upwardly and the bevel of the lower knife sloping downwardly.

5. The machine of claim 4, including a transverse slot in said table receiving a battery panel severed by said lower knife.

* * * * *